No. 749,035. PATENTED JAN. 5, 1904.
L. J. DAVIS.
STOCK MARKER.
APPLICATION FILED APR. 16, 1903.
NO MODEL.
Fig. 1.
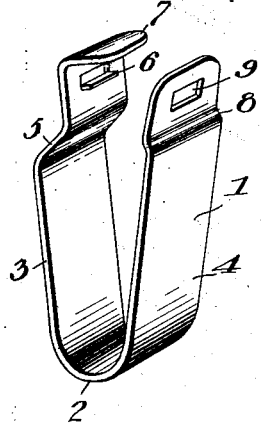
Fig. 2.
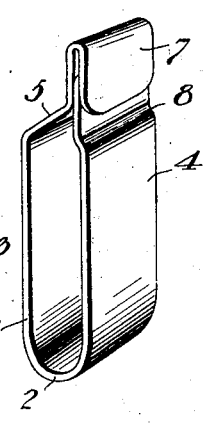
Fig. 3.
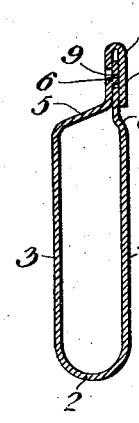
Fig. 4. Fig. 5. Fig. 6.
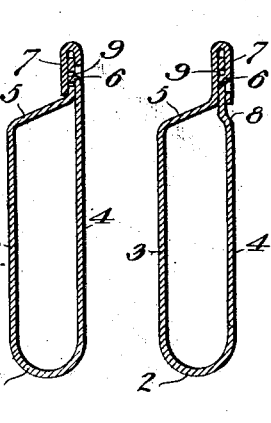
Linford J. Davis, Inventor.

No. 749,035. Patented January 5, 1904.

UNITED STATES PATENT OFFICE.

LINFORD J. DAVIS, OF BATTLECREEK, MICHIGAN.

STOCK-MARKER.

SPECIFICATION forming part of Letters Patent No. 749,035, dated January 5, 1904.

Application filed April 16, 1903. Serial No. 152,946. (No model.)

*To all whom it may concern:*

Be it known that I, LINFORD J. DAVIS, a citizen of the United States, residing at Battlecreek, in the county of Calhoun and State of Michigan, have invented a new and useful Stock-Marker, of which the following is a specification.

This invention relates to certain improvements in cattle-tags or identifying-markers of that class which are usually attached to the ear of an animal and bear identifying characters—such, for instance, as the name of the owner of the cattle or his private brand or the animal's registry-number.

The primary object of the invention is to provide a simple, inexpensive, and efficient device of this character which may be easily and quickly attached to the ear of the animal without the use of pins, rivets, or similar auxiliary fastening devices.

A secondary object of the invention is to provide a cattle tag or marker stamped from a single piece of material and comprising a U-shaped body portion provided at one end with an overhanging hook and an inwardly-extending securing-tongue, the other end of the tag being formed with an offset or shoulder and an opening for the reception of the securing-tongue, the overhanging hook being adapted to be forced inwardly and downwardly upon the perforated end of the body portion, securely locking the ends thereof together.

A further object is to produce a tag the fastening ends of which extend beyond the edge of the animal's ear, making it more convenient to clench or otherwise secure the same together, there being no projecting shoulders to catch on wires or other obstructions, causing the tag to be torn out and lacerate or otherwise injure the animal's ear.

A still further object is to provide a tag in which the clenching or securing means being beyond the edge of the ear will permit the secure fastening of the tag without danger of pinching the ear during and after the placing of the tag in position, and thus avoid constant pressure from a badly-placed tag, and consequent pain and injury to the animal.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the spirit or sacrificing any of the advantages of this invention.

In the accompanying drawings, Figure 1 is a general view illustrating the application of my improved tag to the ear of an animal. Fig. 2 is a perspective view of the tag open. Fig. 3 is a similar view showing the tag closed. Fig. 4 is a longitudinal sectional view of the same, and Figs. 5 and 6 are modified forms of the invention.

Similar numerals of reference indicate corresponding parts in all the figures of the drawings.

1 designates the tag, which is preferably struck from a single piece of metal, preferably aluminium, on account of its lightness and non-corrosive qualities, although any other suitable material may be employed, if desired. The tag is bent upon itself, as shown at 2, forming a U-shaped body portion and defining two substantially parallel arms 3 and 4, upon which are stamped, printed, or otherwise affixed identifying characters, said arms being adapted to receive a portion of the animal's ears between them, as clearly shown in the drawings. The arm 3 is provided with a shoulder 5 and an upstruck integral tongue 6, the end of the arm terminating in an overhanging hook 7. The arm 4 is provided with an offset 8 at a point adjacent the end thereof and an opening 9, adapted to receive the tongue 6 of the arm 3 when the tag is secured in position, the overhanging hook 7 being forced inwardly and downwardly and clenched or otherwise secured to the offset portion of the arm 4, securely locking the parts together. The tongue 6 being seated in the opening 9 effectually prevents the withdrawal of the arm 4 after the hook 7 has been clenched or otherwise secured to said arm, while the hook fits in the recess formed by the offset 8 and presents a smooth unobstructed surface, preventing the tag from catching in wires or other obstructions. In applying the tag an incision is made in the animal's ear with a specially-constructed punch and the arm 4 of the tag introduced therein and adjusted until the arms lie parallel one on each side of the animal's ear, with the securing ends extending slightly beyond the edge of the same, as clearly shown in Fig. 1 of the drawings. The ends of the arms are then forced together, causing the tongue 6 to engage the opening 9 and the overhanging hook forced downwardly with a pair of pliers or similar instrument and clenched or otherwise secured to the offset portion of the arm 4, securely locking the parts together.

It will be observed that the overhanging hook is made sufficiently long to completely cover the opening in the arm 4 when the parts are locked, thereby preventing the tongues from being accidentally displaced and said arm working loose.

In Fig. 5 I have shown a modified form of tag in which the tongue and overhanging hook are formed on the end of the arm 4, while the tongue-receiving opening is formed in the arm 3, the parts being locked together in the manner before stated.

In Fig. 6 I have shown a further modification in which the tongue is struck up from the hooked end of the arm 3, engaging an opening 6 in the arm 4.

From the foregoing description it will be seen that I have provided a simple, inexpensive, and efficient marking-tag which may be quickly and easily applied and which will be securely retained from accidental displacement.

While the embodiment of the invention herein illustrated is perhaps preferable, it is evident that the general design of the tag may be varied in accordance with the desires of the individual user.

Having thus described the invention, what I claim, and desire to secure by Letters Patent, is—

1. A cattle-tag formed of a metal strip bent to form two arms one of which is provided with an opening and the other with a securing-tongue, one of said arms being bent to overlap the end of the other.

2. A cattle-tag comprising a U-shaped member provided with interlocking end portions, one of said end portions being bent to overlap the end of the other.

3. A cattle-tag comprising a pair of spaced parallel arms having inbent end portions, one of said arms being provided with a securing means and bent to overlap the end of the other.

4. A cattle-tag comprising a metal strip bent to form two arms each having inbent end portions, one of which is provided with an opening and the other with a securing-tongue, one of said arms being bent to overlap the end of the other.

5. A cattle-tag comprising a strip of metal bent to form two arms of unequal length and provided with interlocking end portions, the longer arm being bent to overlap the end of the shorter arm and adapted to lock the ends of said arm together.

6. A cattle-tag comprising a U-shaped body portion, one end of which is provided with an integral securing-tongue and the other with a tongue-receiving opening, and an overhanging hook formed integral with one end of the body portion and adapted to overlap the end of the other.

7. A cattle-tag comprising a strip of metal bent to form two arms of unequal length, one of which is provided with an opening and the other with an upstruck securing-tongue, the longer arm being bent to overlap the end of the shorter arm and adapted to clamp said arms together.

8. A cattle-tag comprising a strip of metal bent to form two arms each having inbent end portions, one of said arms being provided with an opening and the other with a securing-tongue, one of said arms being bent to overlap the end of the other and extended over the tongue-receiving opening.

In testimony that I claim the foregoing as my own I have hereto affixed my signature in the presence of two witnesses.

LINFORD J. DAVIS.

Witnesses:
 KARL D. KEYES,
 MINNIE E. KEYES.